Jan. 9, 1951 T. B. SANSBURY 2,537,551
MECHANICAL HAND
Filed Oct. 27, 1949 2 Sheets-Sheet 1
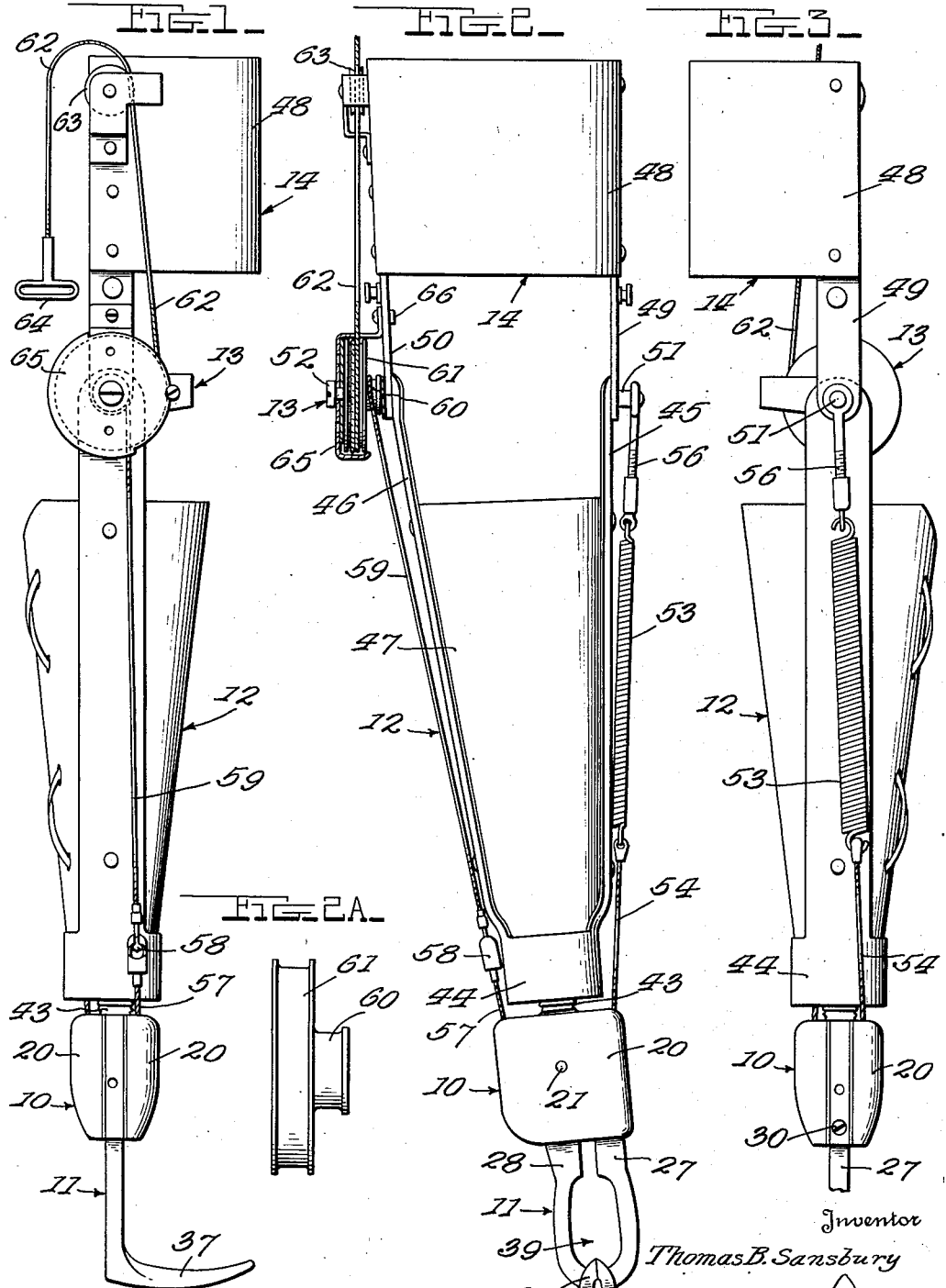
Inventor
Thomas B. Sansbury
By Bryant & Lowry
Attorneys Jan. 9, 1951 T. B. SANSBURY 2,537,551
MECHANICAL HAND
Filed Oct. 27, 1949 2 Sheets—Sheet 2
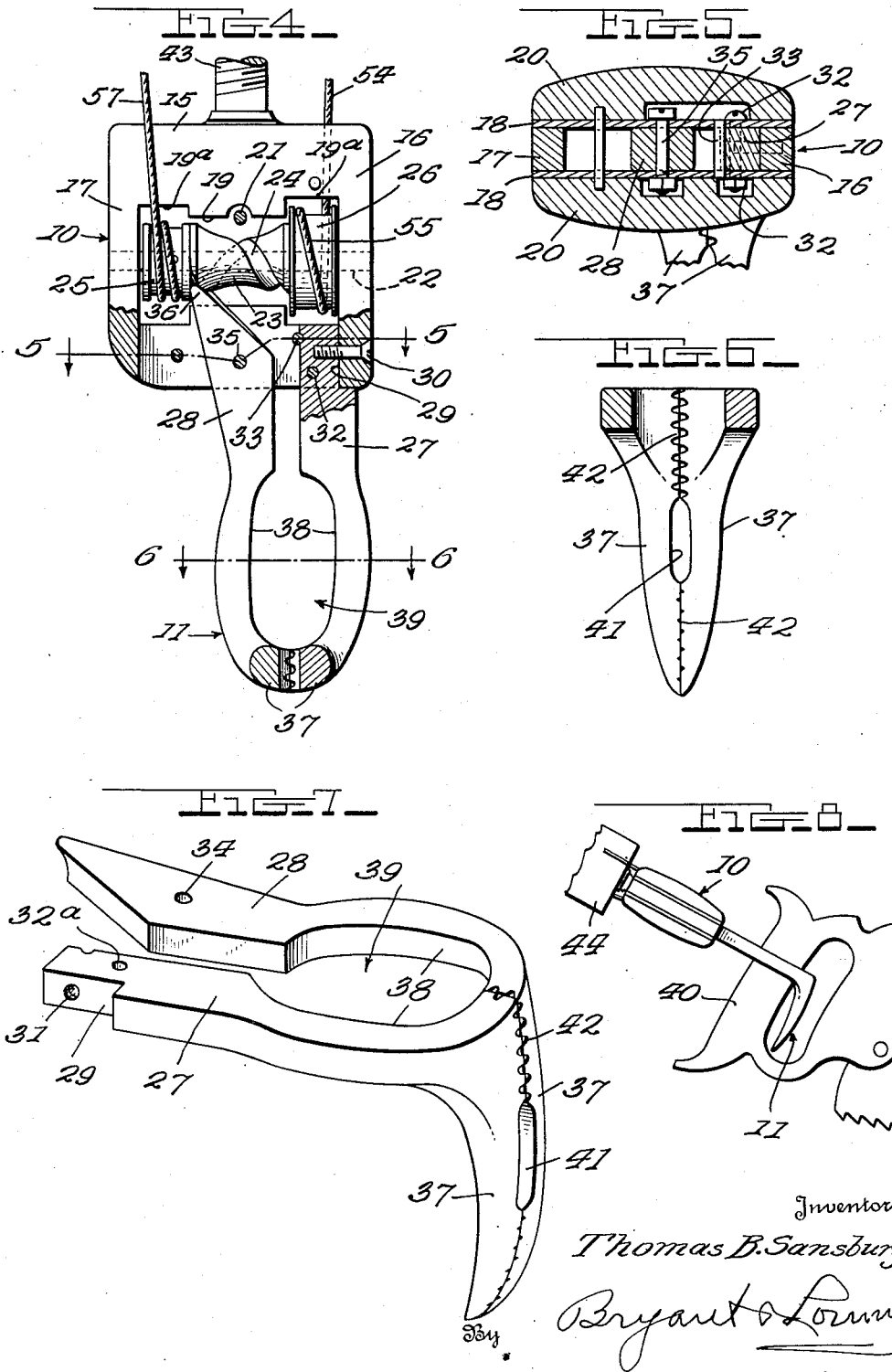
Inventor
Thomas B. Sansbury
By Bryant & Lowry
Attorneys Patented Jan. 9, 1951

2,537,551

UNITED STATES PATENT OFFICE 2,537,551

MECHANICAL HAND

Thomas B. Sansbury, Orlando, Fla.

Application October 27, 1949, Serial No. 123,818

9 Claims. (Cl. 3—12)

This invention relates to certain new and useful improvements in prosthetic devices in the nature of artificial or mechanical hands of the type generally disclosed in application for patent filed by Thomas B. Sansbury on February 6, 1948, Serial No. 6,741, now Patent Number 2,532,732 and embodies improvements in the art thereover.

The mechanical hand or hook disclosed in this application is of the general type covered in the above-identified application and has for its primary object to simplify the construction thereof and increase the gripping action of the hook members.

A further object of the invention is to provide a mechanical hand of the foregoing character that is entirely automatic in its operation and one that requires a minimum of shoulder movement to effect opening or separation of a pivotally mounted hook from a fixed hook member.

A further object of the invention is to provide a mechanical hand wherein the tensioning devices for the movable hook of the gripper are exposed for ready access so that the tensioning devices may be easily and quickly adjusted to obtain the proper gripping action of the hook members.

A still further object of the invention is to provide a mechanical hand of the foregoing character wherein the hook members thereof are designed for the gripping of relatively small articles, such as writing implements, a pen or pencil, and also for the gripping of larger and heavier implements, such as the handles of saws, sledge hammers or the like.

A still further object of the invention is to provide a mechanical hand of the foregoing character wherein shoulder movement of the user controls all operations of the hand, the device being entirely automatic in its operation and without any latching or locking devices which would require the use of the other hand of a person.

With the above and other objects in view that will become apparent as the nature of the invention is better understood, the same consists in the novel form, combination and arrangement of parts hereinafter more fully described, shown in the accompanying drawings, and claimed.

In the accompanying drawings:

Figure 1 is a side elevational view of a mechanical hand constructed in accordance with the present invention, Figure 2 is a front elevational view showing the shoulder-operated cable for the movable hook of the hand with the pulley construction at the elbow joint reducing shoulder movements for the maximum and minimum operation of the movable hook and the exposed tension adjusting device for the movable hook, Figure 2A is a side elevational view of the double pulley construction at the elbow joint to increase hook movement with a minimum of shoulder movement, Figure 3 is a side elevational view, opposite to Figure 1, showing the exposed adjustable spring for varying tension on the movable hook, Figure 4 is a fragmentary plan view, partly in section, with a cover plate removed and showing the operating mechanism for the movable hook and the improved construction of the hooks per se to facilitate gripping of larger objects, Figure 5 is a cross-sectional view taken on line 5—5 of Figure 4, Figure 6 is a cross-sectional view taken on line 6—6 of Figure 4, showing the recessed end portions of the hooks for gripping small objects and the serrated or rigid opposed faces of the end portions of the hooks, Figure 7 is an enlarged perspective view showing the two hooks removed from the apparatus, and Figure 8 is a schematic view with a part of the mechanical hand engaged with the handle of a saw.

A mechanical hand, as illustrated in Figures 1, 2, and 3 comprises a casing 10 housing mechanism for the operation of hooks designated in general by the reference character 11, the casing 10 being carried by an arm or cuff portion 12 that extends to an elbow joint 13 and above said elbow joint there is provided an arm brace 14.

As shown more clearly in Figures 4 and 5, the casing 10 includes a central bar-like body of generally U-shape having a cross bar 15 and side legs 16 and 17, and said U-shaped member has an inclosing plate 18 secured to each side thereof as shown in Figure 5 and each plate having a transversely extending elongated opening 19 therein of generally H-shape defining elongated end open portions 19ᵃ extending longitudinally of the casing. Each side of the casing has a cover plate 20 overlying the inclosing plates 18 and these cover plates are secured in position by means of a headed screw 21 passing through the opening 19 in the two plates 18, the shank of the screw being shown in Figure 4.

A shaft 22 extends transversely of the H-opening 19 and is mounted at its ends in the side legs 16 and 17 of the U-shaped body and supports intermediate the ends thereof a rigidly mounted screw 23 of concave formation and having a spiral thread groove 24 therein. A cord of cable pulley 25 is fixed to the end of the shaft 22 adjacent the leg 17 and a cord or cable pulley 26 is fixed to said shaft at its other end adjacent the leg 16 of the U-shaped body, these pulleys having cables wound thereon respectively for the tensioning of the screw 23 and the operation of a movable hook forming a part of the mechanical hand.

The hook elements of the mechanical hand include a fixed hook 27 and a pivotally mounted hook 28 shown more clearly in Figures 4 and 7, the outer side of the fixed hook 27 being rabbeted as at 29 for interfitting engagement with the outer end of the side leg 16 of the U-shaped body and rigidly anchored therein by a screw 30 passing through the leg 16 from the outer side thereof and entering the threaded opening 31 as illustrated. To further anchor the fixed hook 27 in position in the casing, a nut and bolt combination 32 extends through an opening 32ª in the inner end of the hook 27 and the inclosing plates 18, while a pin 33 extending between the plates 18 is positioned for engagement with the exposed side of the inner end of the hook 27.

The movable or pivotally mounted hook 28 has an opening 34 therein for the passage of a headed bolt 35 passing through the inclosing plates 18 and the inner end of said pivoted hook 28 tapers to a finger 36 engaged in the spiral thread groove 24 in the screw 23. As illustrated in several of the figures, the hooks 27 and 28 are normally parallel when in their closed gripping position and the outer ends of said hooks are turned at right angles to form gripping fingers 37. The parallel portions of the hooks 27 and 28 have the exposed faces thereof recessed as at 38 to form an elongated substantially oval shaped opening 39 therebetween as illustrated in Figures 2, 4, and 7, the better to facilitate the gripping of a handle, such as the handle 40 of a saw as shown in Figure 8, or the handle of hammers of various dimensions, including sledge hammers. The opposed faces of the gripping fingers have a relatively small recessed portion 41 intermediate their ends to facilitate the gripping of smaller objects, such as writing implements, pens, pencils or the like, and the remaining portions of the opposed faces of the fingers have interfitting serrated edges as shown at 42 to maintain proper relationship between the fingers of the two hooks for more efficient gripping of objects.

As shown in Figures 1 to 4, the cross bar 15 of the U-shaped body carries intermediate its ends an inwardly extending threaded lug 43 for attachment to the base member 44 of the arm or cuff portion designated in general by the reference character 12 and which portion includes a pair of upwardly diverging arms 45 and 46 carrying a flexible leather hood or cuff 47 with the arms extending a distance approximately the elbow joint of an arm. The arm brace 14 comprises an upper arm band or strap 48 that is connected by a pair of rods 49 and 50 to the upper ends of the arms 45 and 46 by pivot pins 51 and 52. The shaft 22 and screw 23 are tensioned in one direction of rotary movement for placing the finger 36 of the pivoted hook 28 at the outer end of the spiral groove 24 nearest the pulley 25 and leg 17, and such tensioning means includes a coil spring 53 exposed exteriorly of the arm or cuff portion 12, the outer end of the spring having a cable 54 attached at one end thereto with the other end of the cable entering the casing through the upper end thereof for winding on, as shown at 55, and anchoring to the pulley 26. The upper end of the exposed spring 53 has a turnbuckle connection 56 with the elbow pin 51.

To effect rotation of the screw 23 against the spring tension thereon and to cause the finger 36 of the pivoted hook to ride along the spiral groove 24 with the resultant pivotal movement of the hook 28 to space it from the rigidly mounted hook 27, a relatively short cable 57 has its end fixed to the pulley 25 with several turns on the pulley and passage from the casing 10 for a separable end connection 58 with a longer cable section 59 that winds on and is anchored to the relatively small pulley element 60 of a double pulley block journaled on the elbow pin 52. The larger pulley 61 of the double pulley block has one end of the cable 62 anchored thereto with the cable 62 passing from the larger pulley 61 and over a guide pulley 63 carried by the arm brace 14 with an attachment 64 at the free end of the cable 62 that is engaged with a shoulder operating strap or other devices. A circular cover plate 65 overlies the double pulley construction as shown in Figures 1 and 2 and is attached to the rod 59 as at 66.

Only a minimum of shoulder movement is required for the operation of the movable hook 28, the cable 62 working over the relatively large pulley 61, causing the cable 59 to be wound on the smaller pulley 60 for a pull on the cable 57 which operates the screw 23 to cause the finger 36 at the inner end of the movable hook 28 to travel in an arcuate path through the arcuate valley in the screw 23 and track in the spiral groove 24, such rotative movement of the screw 23 being against the tension of the spring 53 that may be readily varied or changed to meet requirements by adjusting the turnbuckle device 56. The double pulley block construction 60—61 requires only a minimum of shoulder movement for the relatively easy operation of the pivoted hook 28, all of the assembled parts being of extremely simple and sturdy construction, the mechanical hand being wholly automatic in its operation and embodying comparatively few parts.

In the absence of any latching or locking devices, shoulder movement only of the user acts for complete operation of the mechanical hand.

While there is herein shown and described the preferred embodiment of the invention, it is nevertheless to be understood that minor changes may be made therein without departing from the spirit and scope of the invention as claimed.

I claim:

1. In an artificial hand, a body, an article-gripping arm immovably fixed to said body, a second arm pivotally mounted intermediate its ends on said body and movable toward and from the fixed arm, said second arm having an outwardly extending article gripping portion and a second portion extending inwardly of said body, an operating screw extending transversely of said body, a nose on the second portion of said second arm directly engaging said screw, and means to rotate said screw about its longitudinal axis in two directions, including a pulley on each end of the screw, a shoulder operated cable on one pulley, an exteriorly mounted variably adjustable spring and a cable connection between the spring and other pulley for tensioning the screw in one direction of rotation.

2. In an artificial hand, a body, an article-gripping arm immovably fixed to said body, a second arm pivotally mounted intermediate its ends on said body and movable toward and from the fixed arm, said second arm having an outwardly extending article-gripping portion and a second portion extending inwardly of said body, an operating screw extending transversely of said body, a nose on the second portion of said second arm directly engaging said screw, an arm holster attached to said body and having an elbow joint, a pulley block at the elbow joint, a pulley on one end of the screw, a cable connection between the pulley on the screw and the pulley block, a second cable connection between the pulley block and a shoulder strap and means for tensioning the screw in a direction of rotation against the cable pull thereon.

3. In an artificial hand, a body, an article-gripping arm immovably fixed to said body, a second arm pivotally mounted intermediate its ends on said body and movable toward and from the fixed arm, said second arm having an outwardly extending article-gripping portion and a second portion extending inwardly of said body, an operating screw extending transversely of said body, a nose on the second portion of said second arm directly engaging said screw, an arm holster attached to said body and having an elbow joint, a pulley block at the elbow joint, a pulley on one end of the screw, a cable connection between the pulley on the screw and the pulley block, a second cable connection between the pulley block and a shoulder strap, a pulley on the other end of the screw, a variably tensioned spring attached at one end to the elbow joint and a cable connection between the other end of the spring and last named pulley for tensioning the screw in a direction of rotation against the pull of the first named cable thereon.

4. In an artificial hand, a body, an article-gripping arm immovably fixed to said body, a second arm pivotally mounted intermediate its ends on said body and movable toward and from the fixed arm, said second arm having an outwardly extending article-gripping portion and a second portion extending inwardly of said body, an operating screw extending transversely of said body, a nose on the second portion of said second arm directly engaging said screw, an arm holster attached to said body and having an elbow joint, a pulley block at the elbow joint, a pulley on one end of the screw, a cable connection between the pulley on the screw and the pulley block, a second cable connection between the pulley block and a shoulder strap and means for tensioning the screw in a direction of rotation against the cable pull thereon, said pulley block including a relatively small pulley element for attachment of the cable extending from the screw, and a relatively large pulley element to which the cable is attached that extends to the shoulder strap.

5. In an artificial hand, a body, an article-gripping arm immovably fixed to said body, a second arm pivotally mounted intermediate its ends on said said body and movable toward and from the fixed arm, said second arm having an outwardly extending article-gripping portion and a second portion extending inwardly of said body, an operating screw extending transversely of said body, a nose on the second portion of said second arm directly engaging said screw, an arm holster attached to said body and having an elbow joint, a pulley block at the elbow joint, a pulley on one end of the screw, a cable connection between the pulley on the screw and the pulley block, a second cable connection between the pulley block and a shoulder strap, a pulley on the other end of the screw, a variably tensioned spring attached at one end to the elbow joint and a cable connection between the other end of the spring and last named pulley for tensioning the screw in a direction of rotation against the pull of the first named cable thereon, said pulley block including a relatively small pulley element for attachment of the cable extending from the screw, and a relatively large pulley element to which the cable is attached that extends to the shoulder strap.

6. In an artificial hand, a body, an article-gripping arm fixed to said body, a second arm pivotally mounted intermediate its ends in said body and movable toward and away from the fixed arm, said second arm having an outwardly extending article-gripping portion and a second portion extending inwardly of said body, an operating screw journaled transversely of said body, a nose on the second portion of said second arm and directly engaging said screw, a pulley on each end of the screw, a shoulder operated cable attached to one pulley for rotating the screw to move the pivoted arm away from the fixed arm and a tensioned cable attached to the other pulley for urging the screw in a direction of rotation to hold the arms in engagement with each other.

7. In an artificial hand, a body, an article-gripping arm fixed to said body, a second arm pivotally mounted intermediate its ends in said body, and movable toward and away from the fixed arm, said second arm having an outwardly extending article-gripping portion and a second extending inwardly of said body, an operating screw journaled transversely of said body, a nose on the second portion of said second arm and directly engaging said screw, a pulley fixed on each end of the screw, a shoulder operated cable attached to one pulley for rotating the screw to move the pivoted arm away from the fixed arm and a tensioned cable attached to the other pulley for urging the screw in a direction of rotation to hold the arms in engagement with each other, and means interposed in the shoulder-operated cable to increase the cable pull with a minimum of shoulder movement.

8. In an artificial hand, a body, an article-gripping arm fixed to said body, a second arm pivotally mounted intermediate its ends in said body and movable toward and away from the fixed arm, said second arm having an outwardly extending article-gripping portion and a second portion extending inwardly of said body, an operating screw journaled transversely of said body, a nose on the second portion of said second arm and directly engaging said screw, a pulley fixed on each end of the screw, a shoulder operated cable attached to one pulley for rotating the screw to move the pivoted arm away from the fixed arm and a tensioned cable attached to the other pulley for urging the screw in a direction of rotation to hold the arms in engagement with each other, and means interposed in the shoulder-operated cable to increase the cable pull with a minimum of shoulder movement, including relatively large and small integral pulleys, the cable portion from the shoulder strap passing over the large pulley and the other cable portion extending from the smaller pulley to the associated pulley on the screw.

9. In an artificial hand, a body, an article-gripping arm immovably fixed to said body, a second arm pivotally mounted intermediate its ends on said body and movable toward and from the fixed arm, said second arm having an outwardly extending article-gripping portion and a second portion extending inwardly of said body, an operating screw extending transversely of said body, a nose on the second portion of said second arm directly engaging said screw, and means to rotate said screw about its longitudinal axis in two directions, each arm having a portion in the plane of the body and an angularly bent finger with the two fingers normally engaged and said arm and finger portions having elongated oval shaped recesses therebetween.

THOMAS B. SANSBURY.

REFERENCES CITED

The following references are of record in the file of this patent:

UNITED STATES PATENTS

| Number | Name | Date |
|---|---|---|
| 1,285,617 | Caron | Nov. 26, 1918 |
| 1,310,589 | Trautman | July 22, 1919 |
| 2,347,909 | Jarrett | May 2, 1944 |